United States Patent
Kazmi et al.

(10) Patent No.: US 9,742,533 B2
(45) Date of Patent: Aug. 22, 2017

(54) AVOIDING SERVING CELL INTERRUPTION

(71) Applicant: Telefonaktiebolaget L M Ericsson (publ), Stockholm (SE)

(72) Inventors: Muhammad Kazmi, Bromma (SE); Thomas Chapman, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 14/760,230

(22) PCT Filed: Dec. 5, 2013

(86) PCT No.: PCT/SE2013/051461
§ 371 (c)(1),
(2) Date: Jul. 10, 2015

(87) PCT Pub. No.: WO2014/112920
PCT Pub. Date: Jul. 24, 2014

(65) Prior Publication Data
US 2015/0341148 A1 Nov. 26, 2015

Related U.S. Application Data

(60) Provisional application No. 61/753,990, filed on Jan. 18, 2013.

(51) Int. Cl.
*G01R 31/08* (2006.01)
*H04L 5/00* (2006.01)
(Continued)

(52) U.S. Cl.
CPC ............ *H04L 5/0032* (2013.01); *H04L 5/001* (2013.01); *H04L 5/0073* (2013.01);
(Continued)

(58) Field of Classification Search
CPC ......... H04L 5/00; H04L 5/0032; H04L 5/001; H04L 5/098; H04L 5/0078; H04L 5/0073;
(Continued)

(56) References Cited

U.S. PATENT DOCUMENTS

| | | | | |
|---|---|---|---|---|
| 2008/0310378 A1* | 12/2008 | Kitazoe | ............... | H04W 76/02 370/338 |
| 2011/0134774 A1* | 6/2011 | Pelletier | ............... | H04W 52/365 370/252 |

(Continued)

FOREIGN PATENT DOCUMENTS

| | | | |
|---|---|---|---|
| EP | WO 2012008691 | * | 1/2012 |
| EP | WO2014/112920 A1 | * | 7/2014 |

(Continued)

OTHER PUBLICATIONS

European Search Report issued by the EPO for Application No./Patent No. 13871312.8-1851 / 2946517, Dec. 22, 2015.
(Continued)

*Primary Examiner* — Robert Wilson
(74) *Attorney, Agent, or Firm* — Baker Botts, LLP

(57) ABSTRACT

Techniques for minimizing the loss of radio signals transmitted on and/or received from serving cells in a multi-carrier system by selectively adapting the time instance at which a wireless terminal: (1) changes its radio frequency (RF) bandwidth or activates a second RF chain or any additional RF chain for measuring on one or more secondary serving cells, and/or (2) performs setup or release of one or more secondary serving cells. An example method, implemented in a radio network node, comprises determining (510) a scheduling instance during which a wireless terminal is expected to be scheduled on at least one cell; and, determining (520) a timing at which to send a setup or release command for at least one secondary cell such that the
(Continued)

requested set up or release procedure does not coincide with the scheduling instance.

25 Claims, 6 Drawing Sheets

(51) Int. Cl.
*H04W 72/12* (2009.01)
*H04W 24/08* (2009.01)

(52) U.S. Cl.
CPC .......... *H04L 5/0078* (2013.01); *H04L 5/0098* (2013.01); *H04W 24/08* (2013.01); *H04W 72/1273* (2013.01); *H04L 5/0037* (2013.01); *H04L 5/0039* (2013.01); *H04L 5/0041* (2013.01); *H04L 5/0091* (2013.01)

(58) Field of Classification Search
CPC ..... H04L 5/091; H04L 5/0037; H04L 5/0039; H04L 5/004; H04W 24/08; H04W 72/12; H04W 72/1273
See application file for complete search history.

(56) References Cited

U.S. PATENT DOCUMENTS

| | | | |
|---|---|---|---|
| 2011/0199908 A1 | 8/2011 | Dalsgaard et al. | |
| 2011/0243261 A1* | 10/2011 | Bienas | H04W 72/1215 375/260 |
| 2011/0292915 A1 | 12/2011 | Prakash et al. | |
| 2012/0250558 A1* | 10/2012 | Chung | H04L 1/0026 370/252 |
| 2013/0133428 A1* | 5/2013 | Lee | G06K 9/0012 73/589 |
| 2013/0170414 A1* | 7/2013 | Kwon | H04W 72/042 370/311 |
| 2013/0188619 A1* | 7/2013 | Dinan | H04W 56/0005 370/336 |
| 2015/0304087 A1* | 10/2015 | He | H04W 72/12 370/280 |
| 2015/0341148 A1* | 11/2015 | Kazmi | H04L 5/0098 370/252 |

FOREIGN PATENT DOCUMENTS

| | | |
|---|---|---|
| WO | WO 2011/149920 A2 | 12/2011 |
| WO | WO 2012/008691 A2 | 1/2012 |
| WO | WO 2012/022370 A2 | 2/2012 |
| WO | WO 2012/149456 | 11/2012 |
| WO | WO 2013/172769 A1 | 11/2013 |

OTHER PUBLICATIONS

3GPP TS 25.214 V11.4.0; Technical Specification; 3rd Generation Partnership Project; Technical Specification Group Radio Access Network; Physical layer procedures (FDD) (Release 11), pp. 1-127, Dec. 2012.

PCT Notification of Transmittal of the International Search Report and the Written Opinion of the International Searching Authority, or the Declaration for International application No. PCT/SE2013/051461, May 16, 2014.

* cited by examiner

AVOIDING SERVING CELL INTERRUPTION

PRIORITY

This nonprovisional application is a U.S. National Stage Filing under 35 U.S.C. §371 of International Patent Application Serial No. PCT/SE2013/051461 filed Dec. 5, 2013, and entitled "AVOIDING SERVING CELL INTERRUPTION" which claims priority to U.S. Provisional Patent Application No. 61/753,990 filed Jan. 18, 2013, both of which are hereby incorporated by reference in their entirety.

TECHNICAL FIELD

The technology disclosed herein relates generally to wireless telecommunications networks, and relates more particularly to techniques in a multi-carrier network for avoiding interruption of a serving cell by adaptively activating and deactivating other cells.

BACKGROUND

In a typical cellular radio system, wireless terminals (also known as mobile stations and/or user equipment units (UEs)) communicate via a radio access network (RAN) to one or more core networks. The radio access network (RAN) covers a geographical area that is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Within the local radio area, each cell is identified by an identity, which is broadcast in the cell. The base stations communicate over the air interface with the user equipment units (UE) within range of the base stations.

In some versions of the radio access network, several base stations are typically connected, e.g., by landlines or by a microwave link, to a controller node, such as a radio network controller (RNC) or a base station controller (BSC). The controller node supervises and coordinates various activities of the plural base stations connected thereto. The radio network controllers are typically connected to one or more core networks.

The Universal Terrestrial Radio Access Network (UTRAN) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity.

3GPP has also developed specifications for the Evolved Universal Terrestrial Radio Access Network (E-UTRAN). E-UTRAN comprises the Long Term Evolution (LTE), which is the radio-access technology, and System Architecture Evolution (SAE), which provides core network functionality. Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of an RNC are distributed between the radio base stations nodes (eNodeB's in LTE) and AGWs. Accordingly, the radio access network (RAN) of an LTE system has an essentially "flat" architecture comprising radio base station nodes without reporting to RNC nodes. LTE uses Orthogonal Frequency-Division Multiplexing (OFDM) in the downlink and Discrete Fourier Transform (DFT)-spread OFDM in the uplink.

High Speed Downlink Packet Access (HSPA) enhances the WCDMA specification with High Speed Downlink Packet Access (HSDPA) in the downlink and Enhanced Dedicated Channel (E-DCH) in the uplink. HSDPA achieves higher data speeds by shifting some of the radio resource coordination and management responsibilities to the base station from the radio network controller. Those responsibilities include one or more of the following: shared channel transmission, higher order modulation, link adaptation, radio channel dependent scheduling, and hybrid-ARQ with soft combining.

High Speed Downlink Packet Access (HSPA) employs a new transport channel and three new physical channels. The High Speed Downlink Shared Channel (HS-DSCH) is a downlink transport channel shared by several UEs. The HS-DSCH is associated with one downlink DPCH, and one or several physical channels. The following physical channels have been defined for HSDPA: High Speed Physical Downlink Shared Channel (HS-PDSCH); High Speed Dedicated Physical Control Channel (HS-DPCCH); and the High Speed Shared Control Channel (HS-SCCH). The HS-PDSCH is a downlink channel that is both time and code multiplexed. The HS-DPCCH is an uplink channel that carries the acknowledgements of the packet received on HS-PDSCH and also the CQI (Channel Quality Indication). The HS-SCCH is a fixed rate downlink physical channel used to carry downlink signaling related to HS-DSCH transmission. The HS-SCCH provides timing and coding information, thus allowing the UE to listen to the HS-DSCH at the correct time and using the correct codes to allow successful decoding of UE data.

A physical resource of telecommunications technologies such as LTE and High Speed Downlink Packet Access (HSPA) is expressed in terms of a time-frequency grid, where each resource element corresponds to one subcarrier during one symbol interval. In the time domain, LTE downlink transmissions are organized into radio frames, each radio frame consisting of equally-sized subframes.

The International Telecommunications Union-Radio communications sector (ITU-R) has specified a set of requirements for 4G standards, named the International Mobile Telecommunications Advanced (IMT-Advanced) specification. ITU-R has also stated that Mobile WiMAX and LTE, as well as other beyond-3G technologies that do not fulfill the IMT-Advanced requirements, could nevertheless be considered "4G", provided they represent forerunners to IMT-Advanced compliant versions and have a substantial level of improvement in performance and capabilities with respect to the initial third generation system.

To achieve desired performance requirements of some systems, a concept known as carrier aggregation (CA) has been proposed. With carrier aggregation, two or more component carriers are aggregated for use with a given mobile terminal ("user equipment," or "UE," in 3GPP terminology), for supporting high data rate transmissions over a wide bandwidth, while preserving backward compatibility with legacy systems. In carrier aggregation, the user equipment unit (UE) sets up a radio resource control (RRC) connection first. The cell where the RRC connection request is successful becomes the primary cell of the user equipment unit (UE). The carrier frequency where the primary cell belongs is called primary component carrier (PCC). Then, based on UE capability, the network may configure one or more secondary cells (SCC) on other component carriers, which are then called secondary component carriers. These secondary cells are different from the primary cell, for a given UE, and are on different carrier frequencies.

Thus, multi-carrier or carrier aggregation solutions may be used to enhance peak-rates within a technology. For example, it is possible to use multiple 5-MHz carriers in HSPA to enhance the peak-rate within the HSPA network. Similarly, in LTE, multiple 20-MHz carriers or even smaller carriers (e.g., 5-MHz carriers) may be aggregated in the uplink (UL) and/or on the downlink (DL). Each carrier in a multi-carrier or carrier aggregation system is generally termed as a component carrier (CC) or sometimes is also referred to a cell. Simply put, the component carrier (CC) means an individual carrier in a multi-carrier system.

Carrier aggregation (CA) is also sometimes called (e.g., interchangeably called) "multi-carrier system", "multi-cell operation", "multi-carrier operation", "multi-carrier" transmission and/or reception. Carrier aggregation can be used for transmission of signaling and data in the uplink and downlink directions. One of the CCs is the primary component carrier (PCC), which may be referred to as the primary carrier or anchor carrier. The remaining component carriers are called secondary component carrier (SCC) or secondary carriers or even supplementary carriers. Generally, the primary or anchor CC carries the essential UE specific signaling. The primary CC (also known as the PCC or PCell) exists in both uplink and downlink directions in a carrier aggregation deployment. In the event that there is only a single uplink CC, then the PCell is obviously on that CC. The network may assign different primary carriers to different UEs operating in a given sector or cell.

With carrier aggregation, the UE has more than one serving cell in downlink and/or in the uplink: one primary serving cell and one or more secondary serving cells operating on the PCC and SCC(s) respectively. The primary serving cell is interchangeably called as primary cell (PCell) or primary serving cell (PSC). Similarly, the secondary serving cell is interchangeably called a secondary cell (SCell) or secondary serving cell (SSC). Regardless of the terminology, the PCell and SCell(s) enable the UE to receive and/or transmit data. More specifically the PCell and SCell exist in the downlink and uplink for the reception and transmission of data by the UE. The remaining non-serving cells on the PCC and SCC are called neighbor cells.

The CCs belonging to a given carrier aggregation deployment may belong to the same frequency band, in which the deployment may be referred to as using intra-frequency carrier aggregation, or to different frequency bands, in which case the term inter-band carrier aggregation. These may be combined, e.g., where two CCs in band A and 1 CC in band B are used. Inter-band carrier aggregation where two carriers are distributed over two bands is referred to as dual-band-dual-carrier-HSDPA (DB-DC-HSDPA) in HSPA, or simply as inter-band carrier aggregation in LTE. Furthermore the CCs in intra-band carrier aggregation may be adjacent or non-adjacent in frequency domain, the latter approach being referred to as intra-band, non-adjacent carrier aggregation. A hybrid carrier aggregation deployment comprising of intra-band adjacent, intra-band non-adjacent, and inter-band carrier aggregation is also possible.

Using carrier aggregation between carriers of different radio-access technologies (RATs) may be referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. Yet another example is the aggregation of LTE FDD and LTE TDD carriers. For the sake of clarity, carrier aggregation within the same technology as described may be regarded as "intra-RAT" or simply "single RAT" carrier aggregation.

Multi-carrier operation may also be used in conjunction with multi-antenna transmission. For example, signals on each CC may be transmitted by the eNB to the UE over two or more antennas.

The CCs in carrier aggregation may or may not be co-located in the same site or base station or radio network node (e.g., relay node, mobile relay node, etc.). For instance, the CCs may originate at different locations, e.g., from non-co-located base stations (BS) or from a BS and a remote radio head (RRH) or remote radio unit (RRU). Examples of combined CA and multi-point communication may include the use of a distributed antenna system (DAS), a remote radio head (RRH), a remote radio unit (RRU), Coordinated multi-point (CoMP) transmission techniques, multi-point transmission/reception techniques, etc. The technology described herein may also apply to any of these and other multi-point carrier aggregation systems.

Depending upon the type of multi-carrier capability and the number of component carriers it supports, a UE may have a single radio-frequency (RF) chain or a plurality of RF chains for multi-carrier operation. For example, a UE may have: (1) a single RF chain for intra-band contiguous carrier aggregation; (2) multiple RF chains for inter-band carrier aggregation; or (3) multiple RF chains for intra-band non-contiguous carrier aggregation.

A multi-carrier SCell setup herein refers to a procedure that enables the network to at least temporarily set up or release the use of a SCell by a carrier-aggregation-capable (CA-capable) UE, in the downlink and/or uplink. The SCell setup or release procedure may comprise: (a) configuration and de-configuration of SCell(s), or (b) activation and deactivation of SCell(s).

A configuration procedure is used by the serving radio network node (e.g., a eNode B in LTE or Node B in HSPA) to configure a CA-capable UE with one or more SCells (a downlink SCell, an uplink SCell, or both). On the other hand, the de-configuration procedure is used by the eNode B to de-configure or remove one or more already configured SCells from a UE's current configuration. The configuration or de-configuration procedure is also used to change a current multi-carrier configuration, e.g., for increasing or decreasing the number of SCells or for swapping the existing SCells with new ones. The configuration and de-configuration are done by the eNode B, in LTE systems, and by the RNC, in HSPA systems, using RRC signaling.

A serving radio network node (e.g., an eNode B in LTE or a Node B in HSPA) may activate one or more deactivated SCells or deactivate one or more SCells on the corresponding configured secondary carriers. The PCell is always activated. The configured SCells are initially deactivated upon addition and after a cell change, e.g., handover. In HSPA the activation and deactivation command is sent by the Node B via HS-SCCH. In LTE the activation and deactivation command is sent by the eNode B via a MAC control element (MAC-CE). The deactivation of SCells saves UE battery power.

A SCell setup or release (i.e., when SCell is configured, de-configured, activated or deactivated) may cause a "glitch," or an interruption of operation on the PCell or any other activated SCell. Here, "operation" refers to reception and/or transmission on signals. This glitch mainly occurs when the UE has a single radio chain to receive and/or transmit more than one CC. For example, in the case of intra-band carrier aggregation (where CCs are adjacent) the UE may typically have a single radio if the aggregated BW is 40 MHz, e.g., two carriers each of 20 MHz.

The glitch may occur when the CA-capable UE changes its reception and/or transmission bandwidth (BW) from single-carrier to multiple-carrier operation, or vice versa. In order to change the bandwidth the UE has to reconfigure one or more RF components in the RF chain, e.g., an RF filter, a power amplifier, etc. For example, consider a CA-capable UE supporting two DL component carriers, each of 20 MHz: a primary CC (PCC), and one secondary CC (SCC). If the secondary component carrier is deactivated by the serving/primary cell, then the UE will reduce its bandwidth, e.g., from 40 MHz to 20 MHz. This may cause up to 5 milliseconds of interruption on the PCell on PCC, in LTE. Similarly, if the SCell is configured or de-configured, then the PCell may be interrupted, also for up to 5 milliseconds in LTE. In some scenarios or configuration, the interruption may be shorter, e.g., up to 1-2 milliseconds.

The interruption can be caused by any of several factors including RF tuning to reconfigure (i.e., reduce or increase) an RF bandwidth, setting or adjusting of radio parameters such as AGC setting, etc. Examples of scenarios involving shorter interruption times are: when at least two consecutive DL subframes are available, a time-division duplexing (TDD) configuration with more downlink subframes than uplink subframes in a frame is used, etc. In these scenarios, the AGC setting may be done over a shorter time. In HSPA, the interruptions are typically somewhat shorter (e.g., 1 millisecond), since pilot signals are available in all slots in a frame. This in turn leads to a shorter time for adjusting the RF parameters when activating or deactivated SCell. In any case, these interruptions may correspond to the loss of a significant amount of data, especially if the SCell setup or release is performed frequently, e.g., every 20-50 milliseconds.

Setup/release of a downlink SCell may also cause interruptions in the uplink, e.g., when the SCell and PCell (or another SCell) are TDD cells that may have the same or different DL/UL subframe configurations, or even when both SCell and PCell (or another SCell) are frequency-division duplexing (FDD) cells. Similarly, setup/release of an uplink SCell may cause interruptions in the downlink, e.g., when the SCell and PCell (or another SCell) are TDD cells that may have the same or different DL/UL subframe configurations, or even when both SCell and PCell (or another SCell) are FDD cells.

Setup/release of a DL SCell may also, in some cases, cause interruptions for a UE that has multiple RF chains, when the secondary chain is activated/deactivated and tuned. A UE supporting inter-band carrier or intra-band non-contiguous carrier aggregation typically has separate RF chain for each component carrier.

During the interruption period the UE cannot receive from and/or transmit any signal or information to the network. During the interruption the UE may neither perform measurements due to its inability to receive and/or transmit signals.

Bandwidth reduction when SCell is deactivated or de-configured leads to the following benefits from the UE perspective: preventing the UE from receiving noise outside the current reception bandwidth; and saving UE battery life by lowering the power consumption.

A UE-capable UE is required to perform measurements also on the deactivated SCell(s). In the case of a single RF chain (e.g., for intra-band contiguous carrier aggregation), the UE also needs to re-tune the center frequency and the RF bandwidth to obtain a measurement sample for cell search or for neighbor cell measurements (e.g., CPICH RSCP in HSPA, RSRP in LTE, etc.) on a cell belonging to a deactivated SCC. After the measurement sample is obtained, the UE again retunes the center frequency and the RF bandwidth.

Measurements for a serving cell or neighbor cell typically involve a non-coherent averaging of two or more basic non-coherent averaged samples over a measurement period. The details of the sampling depend upon the implementation of a given UE, and are generally not specified by the 3GPP standards. An example of reference symbol received power (RSRP) measurement averaging in E-UTRAN is shown in FIG. 1. FIG. 1 illustrates that the UE obtains the overall measurement quantity result by collecting four non-coherent averaged samples or snapshots, each of 3 milliseconds length in this example, during the physical layer measurement period. The measurement period may be 200 milliseconds when no discontinuous receive (DRX) is used, or when the DRX cycle is not larger than 40 milliseconds. Similar measurement principles apply to UTRAN measurements, such as for Common Pilot Channel (CPICH) Received Signal Code Power (RSCP) measurements.

An interruption occurs before and after each measurement sample, i.e., when the bandwidth is extended (e.g., from 20 MHz to 40 MHz) and also when it is reverted back to the bandwidth of the activated carriers (e.g., from 40 MHz back to 20 MHz). Each of these interruptions may extend over one or two transmission intervals (TTIs), since the UE has to retune the center frequency and the bandwidth of the downlink. This means that an interruption would occur on the PCC before and after each measurement sample. As a consequence the UE can neither transmit on the UL PCC nor receive on the downlink PCC. This is illustrated in FIG. 2. Since the UE must perform measurements also on deactivated SCell(s), data loss on the PCell and activated SCell(s) will also occur whenever the deactivated SCell(s) are measured.

To support different functions such as mobility (e.g., cell selection, cell reselection, handover, RRC re-establishment, connection release with redirection, etc.), minimization of drive tests, self-organizing network (SON), positioning, etc., the UE is required to perform one or more measurements on signals transmitted by neighboring cells. Prior to carrying out such measurements the UE has to identify a cell and determine its physical cell identity (PCI). Therefore PCI determination is also a type of a measurement.

The UE receives measurement configuration or assistance data/information, which is a message or an information element (IE) sent by the network node (e.g., serving eNode B, positioning node, etc.) to configure UE to perform the requested measurements. For example, the measurement configuration may contain information related to the carrier frequency, RATs, type of measurement (e.g., RSRP), higher-layer time-domain filtering, measurement-bandwidth-related parameters, etc.

Measurements are done by the UE on the serving cell as well as on neighbor cells, over some known reference symbols or pilot sequences. The measurements are performed on cells on an intra-frequency carrier, inter-frequency carrier(s) as well as on inter-RAT carriers(s), if the UE is capable of supporting one or more other RATs. The UE may perform measurements on cells belonging to non-serving carriers (i.e., inter-frequency and/or inter-RAT measurements), with or without measurement gaps (e.g., compressed mode gaps in WCDMA/HSPA), depending upon its capability. When performing measurements on cells belonging to non-serving carrier(s) without measurement gaps, the UE may have to retune its receiver bandwidth, e.g., changing the center frequency of its oscillator. This in turn may also cause interruption of signals on the serving cell of the UE. The techniques detailed below are also applicable to this scenario.

In a multi-carrier or carrier aggregation scenario, the UE may perform the measurements on the cells on the primary component carrier (PCC) as well as on the cells on one or more secondary component carriers (SCCs). A CA-capable UE may also perform inter-frequency measurements without measurement gaps, since the UE has a broadband receiver and/or multiple receivers.

Examples of intra-frequency and inter-frequency measurements in LTE are reference symbol received power (RSRP) and reference symbol received quality (RSRQ). Examples of intra-frequency and inter-frequency measurements in HSPA are Common Pilot Channel Received Signal Code Power (CPICH RSCP) and CPICH Ec/No. When the serving cell is HSPA, inter-RAT measurements may include inter-RAT LTE, inter-RAT GSM, inter-RAT CDMA2000, inter-RAT wireless LAN, etc. Examples of GSM measurements are GSM Carrier RS SI. When the serving cell is LTE FDD, the inter-RAT measurements may include inter-RAT LTE TDD, inter-RAT LTE HSPA, inter-RAT GSM, inter-RAT CDMA2000, inter-RAT wireless LAN, etc. When the serving cell is LTE TDD, inter-RAT measurements may include inter-RAT LTE TDD, inter-RAT LTE HSPA, inter-RAT GSM, inter-RAT CDMA2000, inter-RAT wireless LAN, etc.

The mobility measurement may also comprise identifying or detecting a cell, which may belong to LTE, HSPA, CDMA2000, GSM, etc. The cell detection comprises identifying at least the physical cell identity (PCI) and subsequently performing the signal measurement (e.g., RSRP) of the identified cell. The UE may also have to acquire the cell global ID (CGI) of a cell. In HSPA and LTE the serving cell may request the UE to acquire the system information of the target cell. More specifically the SI is read by the UE to acquire the cell global identifier (CGI), which uniquely identifies a cell, of the target cell. The UE also be requested to acquire other information such as CSG indicator, CSG proximity detection, etc. from the target cell.

Examples of positioning measurements in LTE are reference signal time difference (RSTD) for OTDOA positioning and UE RX-TX time difference measurement for E-CID positioning. The UE RX-TX time difference measurement requires the UE to perform measurement on the downlink reference signal as well as on the uplink transmitted signals.

Channel state information (CSI) measurements performed by the UE are used by the network for scheduling, link adaptation, etc. Examples of CSI measurements are channel quality indicator (CQI), precoding channel indicator (PMI), precoding channel indication (PCI), rank indicator (RI), etc. They may be sent periodically or aperiodically by the UE to the network.

The radio measurements performed by the UE are used by the UE for one or more radio operational tasks. Examples of such tasks are reporting the measurements to the network, which in turn may use them for various tasks. For example, in RRC connected state the UE reports radio measurements to the serving node. In response to the reported UE measurements, the serving network node takes certain decisions, e.g., it may send mobility command to the UE for the purpose of cell change. Examples of cell change are handover, RRC connection re-establishment, RRC connection release with redirection, PCell change in carrier aggregation, PCC change in PCC, etc. In idle or low activity state, an example of cell change is cell reselection. In another example, the UE may itself use the radio measurements for performing tasks, e.g., for cell selection, cell reselection, etc.

A HS-PDSCH scheduling allocation is indicated to a UE using the HS-SCCH channel. The scheduling allocation on HS-SCCH is divided into two sections. In the first section (lasting one slot) the number of PDSCH codes, modulation and the number of spatial layers is indicated. The second section (lasting 2 slots) contains further information on transport format, redundancy version, etc., as well as a user specific cyclical redundancy code (CRC). The first section of one slot is transmitter starting two slots prior to the HS-PDSCH transmission.

A UE may also be required to perform inter-frequency or inter-RAT measurements while in CELL_DCH state and being scheduled with HSDPA data. If the UE possesses a single receiver chain and the measurement may be made by means of extending the bandwidth of the receiver chain then the UE may potentially continue to receive data on the PCell whilst making measurements using the wider bandwidth. If the UE possesses two receiver chains, it is possible to use the second receiver chain to tune to another frequency and make measurements whilst receiving data on the first receiver chain. In this manner, the use of compressed mode and interruptions in downlink data reception may be avoided.

If a UE uses its second receiver chain for making measurements (e.g., for SCell measurements, or for inter-carrier or inter-RAT measurements), then the UE needs to activate the chain, adjust the bandwidth and retune to the correct center frequency, make the measurement, and then deactivate the secondary receiver chain (which deactivation may also include a bandwidth change and retuning of the center frequency). The activation and tuning of the chain may cause interference to the primary receiver. If the UE widens the bandwidth of its single receiver chain, it will also cause interference to the reception of signals on the primary receiver and/or on any activated secondary carriers. This momentary interference may interfere with HS-SCCH and HS-DPDSCH or LTE PDSCH reception and in the worst case cause loss of HS-PDSCH or PDSCH TTIs. The loss could be significant in the case of ongoing measurements. The lost data has to be retransmitted leading to delay in reception and increase the load on PCell and/or activated SCell.

Thus, a multi-carrier-capable UE may cause interruption on a serving cell when it retunes its RF receiver or transmitter bandwidth for performing a radio operation related to secondary cell. Examples of such tasks are performing measurements on deactivated SCell, activating or deactivating SCell, configuring or deconfiguring SCell, etc. Alternatively, the UE may adjust the bandwith of its RF receiver in order to perform measurements on cells on any non-serving carrier, e.g., inter-frequency and/or inter RAT measurements. The interruption on serving cell(s) can cause severe performance degradation. It may also be the case that a UE possesses two or more receiver chains and the UE activates its second or additional receiver chain to perform SCell operations or measurements. In some circumstances, activation of a secondary chain may cause a performance glitch or interruption in the reception of signal via primary chain. Accordingly, techniques for mitigating these problems are needed.

SUMMARY

The technology described herein can be used to avoid or minimize the loss of radio signals transmitted on and/or received from the serving cells in a multi-carrier system by selectively adapting the time instance at which a wireless terminal: (1) changes its radio frequency (RF) bandwidth or activates a second RF chain or any additional RF chain for measuring on one or more secondary serving cells, and/or (2) performs setup or release of one or more secondary serving cells.

Example embodiments and modes include, but are not limited to: (a) a radio network node and methods in a radio network node of adapting SCell setup/release timing to avoid serving cell interruption; (b) a wireless terminal and methods in a wireless terminal of adapting RF bandwidth tuning/second or additional receiver activation timing to avoid serving cell interruption; and (c) a wireless terminal and methods in a wireless terminal of signaling wireless terminal capability related to adaptation of RF bandwidth tuning timing to a network node.

A first example embodiment and mode concerns a radio network node and a corresponding method in a radio network node serving a multi-carrier capable wireless terminal. The method of this first example embodiment and mode comprises determining a scheduling instance during which the wireless terminal is expected to be scheduled on at least one cell and determining a timing at which to send a setup or release command for a secondary cell, based on the scheduling instance, such that the requested setup or release procedure does not coincide with the scheduling instance.

A second example embodiment and mode concerns a multi-carrier capable wireless terminal and a corresponding method of performing at least one radio measurement on at least one deactivated secondary cell in a multi-carrier capable wireless terminal served by a radio network node. The method of the second example embodiment and mode comprises determining a scheduling instance during which the wireless terminal is expected to be scheduled on at least one cell by a radio network node and determining a timing at which to change the radio-frequency (RF) bandwidth of a receiver, or to activate additional RF receiver circuitry, for performing one or more radio measurements on a deactivated secondary cell or for activating or deactivating a secondary cell, such that the timing does not coincide with the scheduling instance. In example implementations, the adaptation may be done autonomously by the wireless terminal, based on a pre-determined rule, or based on explicit indication from the network.

A third example embodiment and mode concerns a multi-carrier capable wireless terminal and a corresponding method in a multi-carrier capable wireless terminal served by a radio network node. The method of the third example embodiment and mode comprises signaling capability information to the radio network node, the capability information indicating that the wireless terminal is capable of adapting a timing at which to extend or shorten receiver RF bandwidth for performing one or more radio measurements on at least one deactivated secondary cell such that the timing does not coincide with a scheduling instance during which the wireless terminal is expected to be scheduled on a cell. In an example implementation the operation of signaling the capability information may be in response to reception of a wireless terminal capability inquiry message from the radio network node.

BRIEF DESCRIPTION OF THE DRAWINGS

The foregoing and other objects, features, and advantages of the technology disclosed herein will be apparent from the following more particular description of several embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
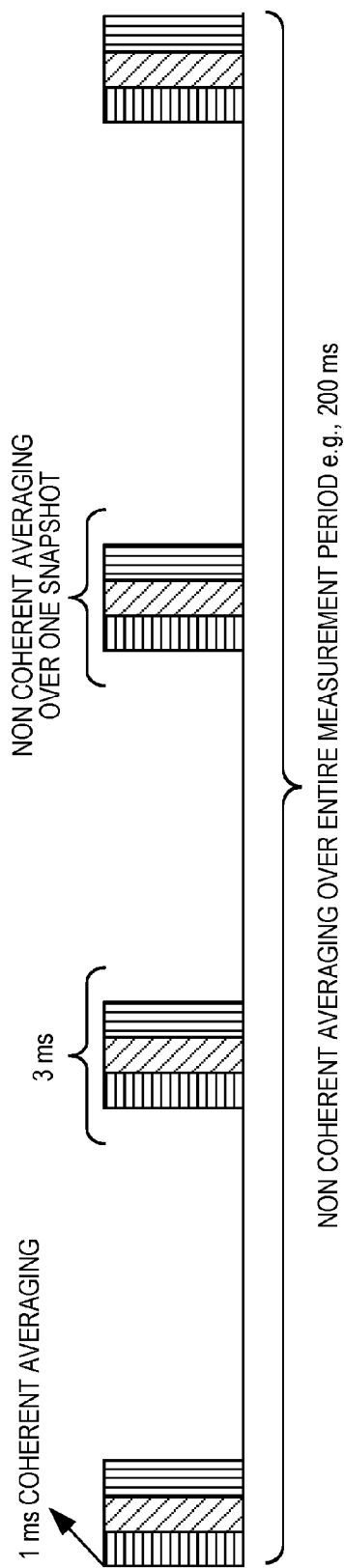
FIG. 1 illustrates an example of RSRP measurement averaging in E-UTRAN.
Figure 2:
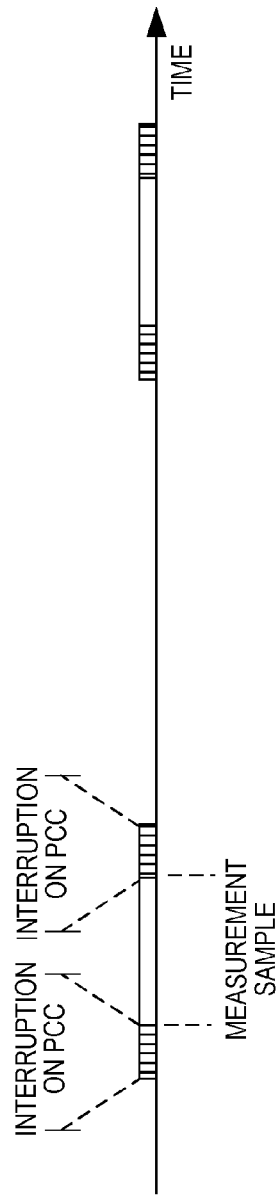
FIG. 2 shows an interruption of PCC due to measurements on cells on the deactivated component carriers, for the case of intra-band contiguous carrier aggregation.

In the following description, specific details are set forth for purposes of explanation and not limitation, including particular architectures, interfaces, techniques, etc., to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. Statements herein reciting principles, aspects, and embodiments of the technology disclosed herein, as well as specific examples thereof, are intended to encompass both structural and functional equivalents. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo-code, and the like represent various processes that may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, and thus machine-implemented.

In terms of hardware implementation, the functional blocks depicted and described herein may include or encompass, without limitation, digital signal processor (DSP) hardware, reduced instruction set processor, hardware (e.g., digital or analog) circuitry including but not limited to application-specific integrated circuits (ASICs), and/or field programmable gate arrays (FPGAs), and state machines capable of performing such functions.

In terms of computer implementation, a computer is generally understood to comprise one or more processors or one or more controllers, and the terms computer, processor, and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 3:
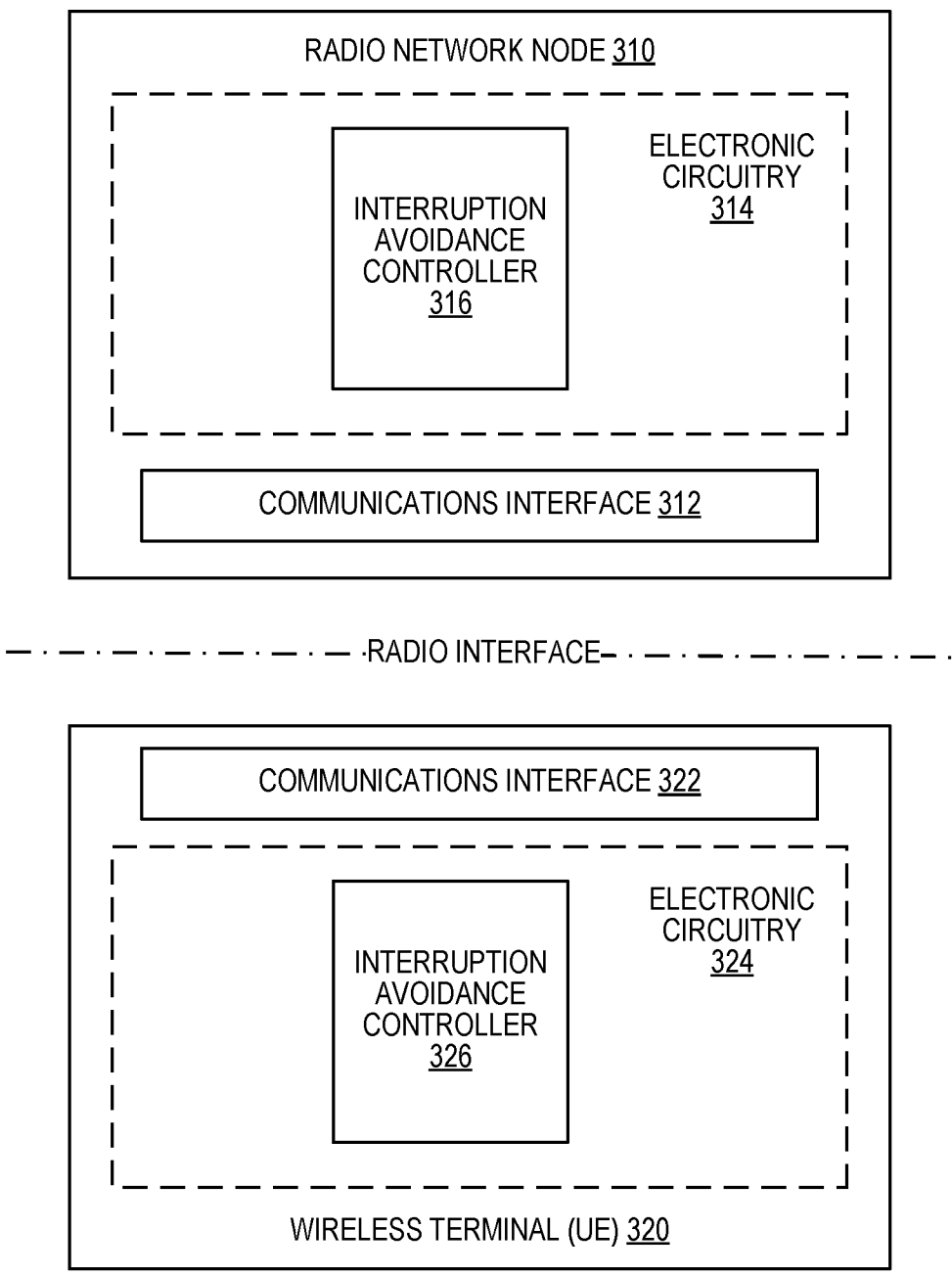
FIG. 3 is a schematic view of a communications system comprising a radio network node and a wireless terminal, at least one of which is configured to avoid interruption of a serving cell by adaptive activation/deactivation of another cell.

The technology described herein serves, e.g., to avoid or minimize the loss of radio signals transmitted on and/or received from the serving cells (primary and/or secondary serving cells) by selectively adapting the time instance at which a wireless terminal: (1) changes its radio frequency (RF) bandwidth or activates a second RF chain or any additional RF chain for measuring on one or more secondary serving cells, and/or (2) performs setup or release of one or more secondary serving cells. To this end, FIG. 3 shows an example radio network node 310, which communicates with a wireless terminal 320 across an air or radio interface (depicted by a dash-dotted line). Radio network node 310 includes a communications interface 312 which, in turn, comprises radio frequency circuitry and one or more antenna for transmitting and receiving information across the air interface. Wireless terminal 320 also includes a corresponding communications interface 322, which likewise comprises radio frequency circuitry and one or more antenna for transmitting and receiving information across the air interface. Example units of the radio network node 310 and wireless terminal 320, which serve to facilitate the selective adaptation of the aforementioned time instance, may be implemented using processing circuits 314 and 324, respectively, each of which may include one or more processors or controllers, for example, and which are typified by including a radio network node interruption avoidance controller 316 and a wireless terminal interruption avoidance controller 326, as shown in FIG. 3, at least one of which is configured to avoid interruption of a serving cell by adaptive activation/deactivation of another cell.

Various example embodiments and modes are described herein. A first example embodiment and mode, represented by FIG. 4 and FIG. 5, concerns a radio network node 310 and a corresponding method of operating radio network node 310, wherein SCell setup/release timing is adapted to avoid serving cell interruption. A second example embodiment and mode, represented by FIG. 6 and FIG. 7, concerns a wireless terminal 320 and a corresponding method of operating wireless terminal 320, wherein the wireless terminal 320 adapts RF bandwidth tuning/second or additional receiver activation timing to avoid serving cell interruption. A third example embodiment and mode, represented by FIG. 10 and FIG. 11, concerns a wireless terminal 320 and a corresponding method of operating wireless terminal 320, wherein the wireless terminal 320 signals wireless terminal capability related to adaptation of RF bandwidth tuning timing to a network node.

Figure 4:
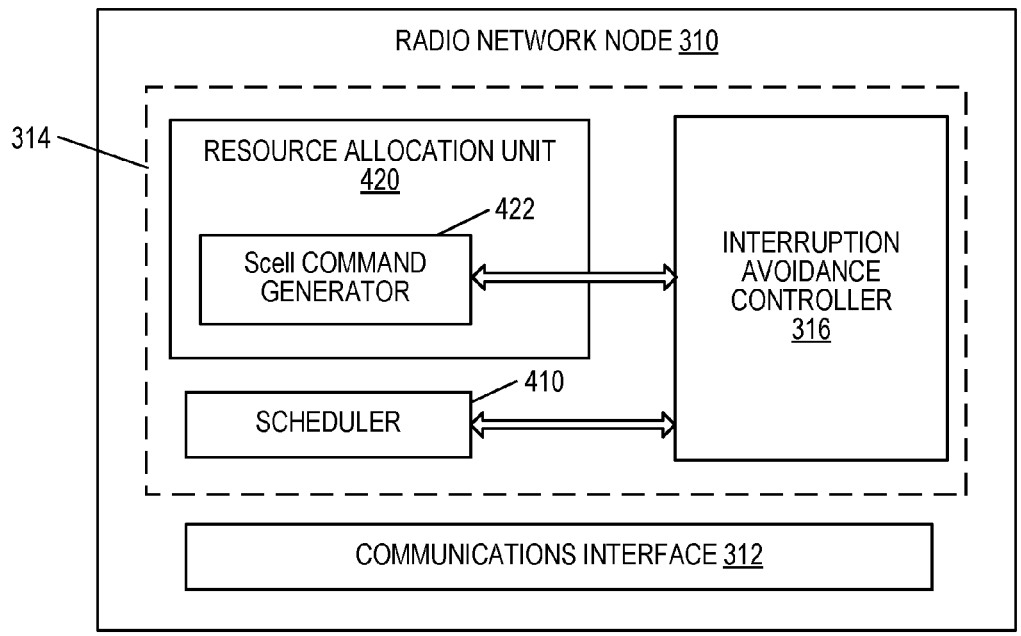
FIG. 4 is a schematic view of an example radio network node according to a first example embodiment and mode.

FIG. 4 shows an example radio network node 310 according to the first example embodiment and mode. The radio network node 310 of FIG. 4 comprises the communication interface 312; a scheduler 410; a resource allocation unit 420; and, the radio network node interruption avoidance controller 316. The scheduler 410 prepares and/or processes a frame, block, or other unit of information for communication across the radio interface 310 with a wireless terminal. As understood in the art, the frame may comprise resource elements which are expressed in context of a time-frequency grid. The resource elements may be grouped or associated to form channels, e.g., either data channels or signaling channels, for example. The resource allocation unit 420 manages the resources of the radio network node 310, e.g., resources of a PCell, at least one first SCell, and possibly one or more second SCells as well. In an example embodiment, the resource allocation unit 420 comprises SCell command generator 422 that, e.g., generates SCell set up and/or release commands for at least one second SCell. The commands generated by the SCell command generator 422 may be forwarded or otherwise used by the scheduler 410 for informing the wireless terminal, via appropriately scheduled channels, what SCells are to be setup or released. As shown in FIG. 4, the interruption avoidance controller 316 cooperates with, e.g., the scheduler 410 and the SCell command generator 422.

Figure 5:
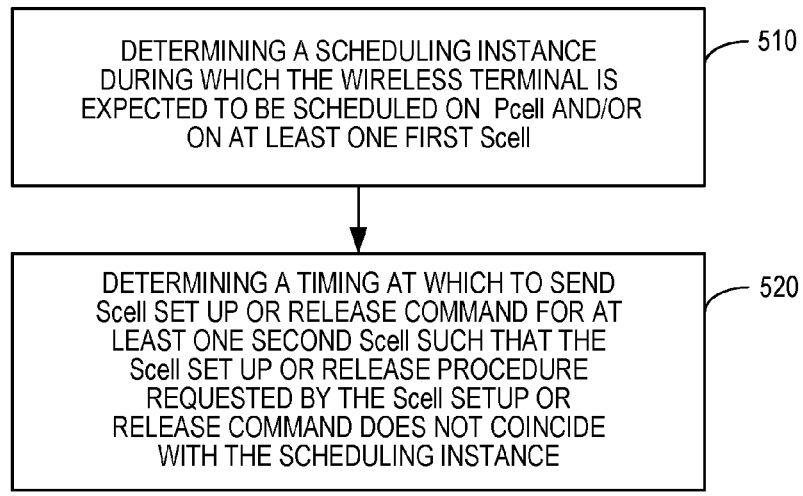
FIG. 5 is a flowchart showing example, representative, non-limiting operations or steps performed by a radio network node of the first example embodiment.

FIG. 5 illustrates example, representative, non-limiting operations or steps performed by the radio network node 310 of the first example embodiment, and particularly by the interruption avoidance controller 316. As shown at block 510, the illustrated method begins with determining a scheduling instance during which the wireless terminal is expected to be scheduled on PCell and/or on at least one first SCell. As shown at block 520, the radio network node 310 determines a timing at which to send SCell set up or release command for at least one second SCell such that the SCell set up or release procedure requested by the SCell setup or release command does not coincide with the scheduling instance. Although not shown in FIG. 5, this may be followed, if not pre-empted by other operations, by the sending of the setup command or release command at the determined timing.

Thus, according to this first example embodiment and mode, the radio network node 310 selectively adapts the timing at which to send a SCell setup or release command to the wireless terminal (UE). The SCell setup or release command referred to means any message or signaling sent to inform the wireless terminal (UE) when it should start activating, deactivating, configuring or deconfiguring one or more indicated SCells included in the said command.

By selectively advancing or delaying the command to the wireless terminal (UE) during the time when wireless terminal (UE) is communicating with one or more activated serving cells (i.e., primary and/or secondary serving cells), the network may avoid loss of radio communication between the wireless terminal (UE) and one or more serving cells. This in turn improves serving cell performance, reduction in packet loss, also improvement in measurement performance, etc.

The selective adaptation of the timing of the SCell setup or release command may be triggered based on one or more of the following conditions or criteria, each of which is discussed in further detail below: depending on data in uplink or downlink buffers; knowledge about wireless terminal (UE) measurement instances, i.e., instances at which the UE performs measurements; scheduling of data; type of service; wireless terminal (UE) measurement reporting instances; and wireless terminal (UE) scheduling request or urgency.

If there is data in the buffer or if the data is above a threshold then the serving radio network node may delay in sending the command, e.g., a secondary cell release command. The network may send the command when, for example, the data in the buffer is reduced below another threshold. The network may check buffer in the network node for downlink transmission and/or may check wireless terminal (UE) reports related to buffer size in the wireless terminal (UE) for uplink transmission. This is because a larger amount of data in the UE and/or network buffer may prompt the scheduler to serve the wireless terminal (UE) on one or more serving cells. Therefore, by keeping SCell deactivated for sometime depending upon buffer size, the scheduler may schedule on PCell or on any activated SCell without losing data due to RF retuning, etc. If there is concurrent scheduling and activation/deactivation or configuration/deconfiguration of SCell(s), then data will be lost.

If the scheduler is scheduling data to the wireless terminal (UE) on one or more serving cells then the network may refrain from immediately sending SCell setup or release command to the wireless terminal (UE). For instance, the network may wait until the data is scheduled or for at least a certain time period, e.g., 5-10 TTIs. The network node may determine whether the wireless terminal (UE) is being scheduled by, for example, checking the contents of downlink control channels that carry scheduling information sent to the wireless terminal (UE). Examples of such channels are HS-SCCH, E-AGCH, etc., in HSPA and PDCCH in LTE.

For certain type of services like such as voice-over-IP (VOIP), real-time video, etc., the wireless terminal (UE) is scheduled by the network at pre-determined instances. For example, the scheduling for VOIP is typically done once every 40 millisecond. This information is available in the network node, e.g., Node B, eNode B, etc. If the wireless terminal (UE) is scheduled with data periodically for such services on one or more serving cells, then the network may adapt the timing at which it sends the SCell setup or release command to the wireless terminal (UE) to avoid data interruption on the serving cells. For example, the network may send the command in between the scheduling instances (i.e., either delaying or advancing the command) to avoid any data interruption on serving cell(s).

The network typically uses wireless terminal (UE) measurement reports such as CSI reports, power headroom, buffer status, etc., to schedule the wireless terminal (UE). Generally, the scheduling is done in one or more subframes immediately after receiving the reports or after pre-determined time from the instant of receiving the reports. The wireless terminal (UE) is typically configured to send reports at pre-determined time, indicated time or with a certain periodicity (e.g., once every 10 milliseconds). The network node may therefore use its knowledge of these measurement reporting instances to avoid interruption on serving cells by sending the said SCell setup or release command in between the wireless terminal (UE) measurement reporting instances or even at the end of wireless terminal (UE) measurement reporting instances.

If the wireless terminal (UE) has sent scheduling request or related information (e.g., happy bit, etc.) requiring a grant for sending data in the uplink, then the network may delay in sending the command (e.g, for secondary cell activation). This is because the network will assign resources to the wireless terminal (UE) in the next possible time instances, in response to the UE request.

The network node may be aware of the instances at which the wireless terminal (UE) performs measurements or, more specifically, when the wireless terminal (UE) obtains measurement samples on deactivated SCell(s) The network may acquire this information based on UE pre-determined measurement behavior, an explicit indication from the wireless terminal (UE), historical measurement data, etc. The network uses this information to avoid interruption on serving cells by sending the said SCell setup or release command in between the measurement sampling instances.

Selective adaptation of the timing of the command may include either sending the SCell setup or release command to the wireless terminal (UE) with a delay or in advance with respect to a reference time instance. The reference time may be any instance at which the network would send SCell setup or release command to the wireless terminal (UE) without taking into account any impact on signal interruption the activated serving cells.

In one example, when an interruption is expected due to the application of SCell setup or release command by the wireless terminal (UE), the network may the command by a particular length of time or a particular number of subframes, e.g., always by 5 milliseconds.

Figure 6:
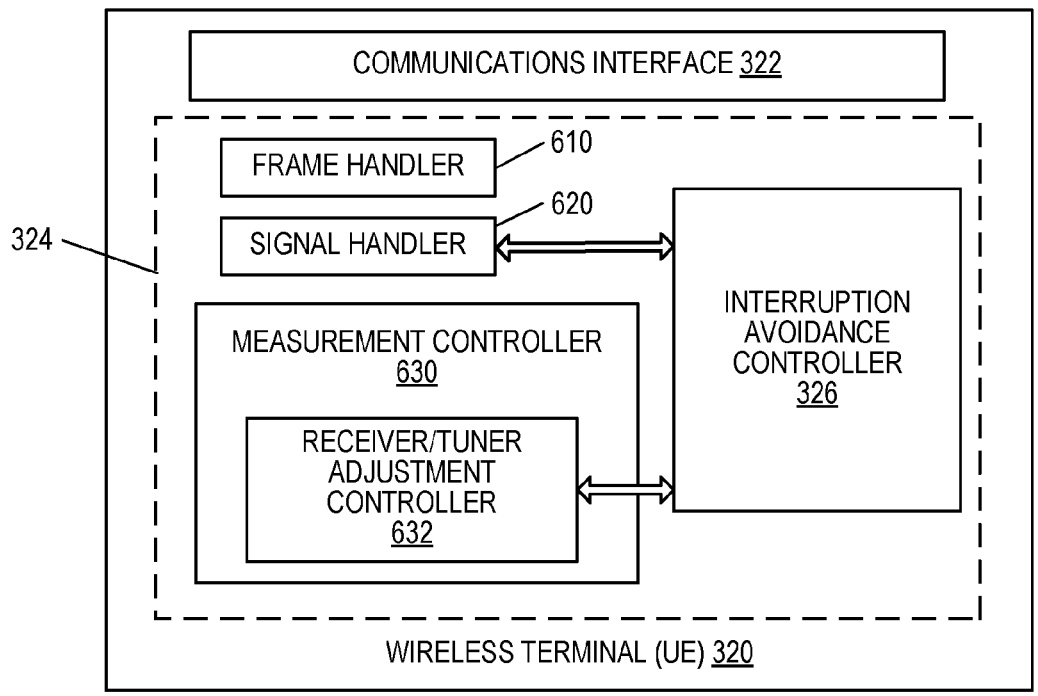
FIG. 6 is a schematic view of an example wireless terminal according to a second example embodiment and mode.

FIG. 6 shows an example wireless terminal 320 according to the second example embodiment and mode mentioned above. This second example embodiment and mode concerns a multi-carrier capable wireless terminal 320 and a corresponding method of performing at least one radio measurement on at least one deactivated second SCell in a multi-carrier capable wireless terminal 320 served by a radio network node.

The wireless terminal 320 of FIG. 6 comprises a communication interface 322; a frame handler or scheduler 610; a signal handler 620; a measurement controller 630; and the wireless terminal interruption avoidance controller 326. The frame handler/scheduler 610 processes the frame, block, or other unit of information communicated across the radio interface with the radio network node. Such processing may include de-formatting portions of the frame to obtain information transmitted on the downlink and formatting portions of the frame for transmission on the uplink. The signal handler 620, which may coincide with or be separate from the frame handler 610, depending on the type of signal received, interprets and processes signals received from the radio network node and prepares signals destined to the radio network node. The measurement controller 630 performs measurements, e.g., of cells and signals thereof as described herein, as required by the wireless terminal 320, which may include measurements made at the request of the radio network node. The measurement unit 630 comprises a receiver/tuner adjustment controller 632, which changes the RF bandwidth of a receiver and/or activates a second RF receiver or additional RF circuitry in case of multiple RF chains, for performing the radio measurement on at least one second deactivated SCell. As shown in FIG. 6, the interruption avoidance controller 326 cooperates with, e.g., the signal handler 620 or frame handler/scheduler 610 and the receiver/tuner adjustment unit 632.

Figure 7:
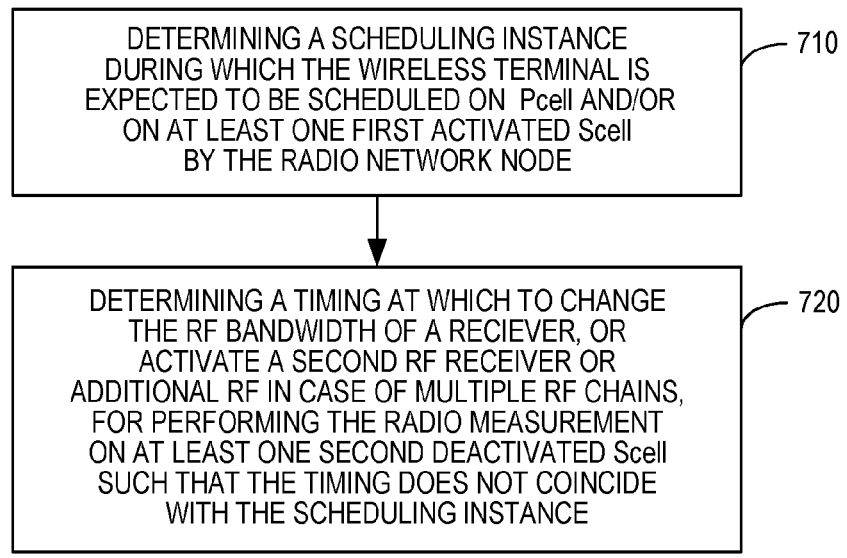
FIG. 7 is a flowchart showing example, representative, non-limiting operations or steps performed by a wireless terminal of the second example embodiment.
Figure 8:
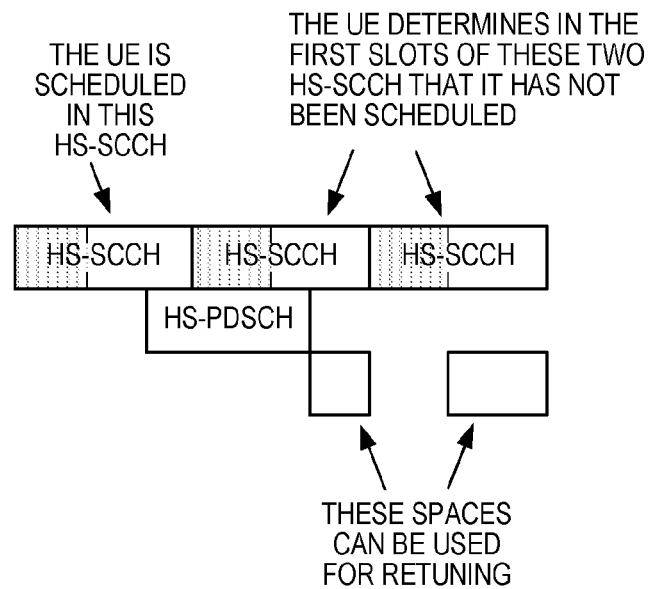
FIG. 8 illustrates slots of a HS-SCCH channel.

FIG. 7 illustrates example, representative, non-limiting operations or steps performed by the wireless terminal 320 of the second example embodiment, and particularly by the wireless terminal interruption avoidance controller 326. As shown at block 710, the illustrated method comprises determining a scheduling instance during which the wireless terminal is expected to be scheduled on PCell and/or on at least one first activated SCell by the radio network node. As shown at block 720, the wireless terminal 320 then determines a timing at which to change the RF bandwidth of a receiver, or activate a second RF receiver or additional RF in case of multiple RF chains, for performing the radio measurement on at least one second deactivated SCell, such that the timing does not coincide with the scheduling instance. In example implementations the adaptation may be done autonomously by the wireless terminal, based on a pre-determined rule, or based on explicit indication from the network. While not shown in FIG. 7, this is generally followed, by changing the RF bandwidth or activating the RF circuitry according to the determined timing.

Thus, in the second example embodiment a multi-carrier capable wireless terminal (UE) may have to retune its RF receiver and/or transmitter bandwidth or to activate a secondary receiver due to one or more of the following reasons: upon reception of SCell setup or release command; and when measuring on deactivated SCell(s). The above scenarios cause interruption of signals on activated serving cells, i.e., PCell and/or SCell(s).

According to some aspects of the second example embodiment, in order to avoid signal interruption on activated serving cells, the wireless terminal (UE) itself selectively adapts the timing instance when to retune its RF bandwidth for performing measurement on deactivated SCells and/or on other non serving carriers or RATs and/or applying received SCell setup or release command.

The wireless terminal (UE) may adapt the timing in the above scenarios autonomously, based on pre-determined rules or based on indication received from the network. Example scenarios are described below.

One example scenario concerns adapting timing for performing measurement on deactivated Scells, other carriers, or other RATs. According to this aspect of the technology described herein, the wireless terminal (UE), prior to performing a measurement on a deactivated Scell, another carrier or another RAT, may first determine whether it is being scheduled or expected to be scheduled on one or more serving cells. If the wireless terminal (UE) determines that it is being scheduled or expected to be scheduled within a certain time instance then the wireless terminal (UE) delays the measurement sampling. If the wireless terminal (UE) has prior information about the scheduling then it may also adapt the time instance for doing measurement, based on this information.

The wireless terminal (UE) may determine about scheduling by using any of several mechanisms. For example, the wireless terminal (UE) may retune its receiver to change its RF bandwidth (either increasing or reducing the bandwidth) spanning the activated serving cells and the Scells/carriers/RATs to be measured, either before or after the expected scheduling instance or subframes. Similarly, if the wireless terminal (UE) is already doing a measurement on a deactivated Scell/carrier/RAT then it may have to again retune its RF bandwidth (e.g., reduce bandwidth) after obtaining the measurement sample. In this case as well, the wireless terminal (UE) first checks to determine whether or not it is being scheduled on serving cells. If it is being scheduled, then the wireless terminal (UE) may delay the RF retuning of its bandwidth.

The performance of radio measurement is guaranteed by a set of pre-defined requirements that the wireless terminal (UE) is required to meet. Examples of these pre-defined requirements (which may be referred to as "measurement requirements," "performance requirements," or the like) for radio measurements are: cell identification delay, CGI reporting delay, measurement period, measurement reporting delay, measurement reporting time, wireless terminal (UE) transmit timing accuracy, measurement accuracy, evaluation period of out-of-sync in radio link monitoring (RLM), evaluation period of in-sync in RLM, wireless terminal (UE) transmit-timing accuracy, etc.

These requirements may also interchangeably be referred to as performance figures, performance requirements, or measurement requirements, etc. The specific requirements depend upon the type of measurement or procedure (e.g., handover, positioning), etc.

If the measurement instances, i.e., the instances at which the UE performs measurements, are adapted by the wireless terminal (UE) to avoid serving cell interruption, then the wireless terminal (UE) may have to adapt one or more radio measurement operations or procedures in order to meet any of the pre-defined requirements. Examples of adaptation of radio measurement operations or procedures are adaptation of radio measurement sampling rate, length of radio measurement samples, instance of samples, etc. A wireless terminal (UE) not adapting the radio operations may not meet the pre-defined requirements which are verified by conformance testing.

A second example scenario of the second example embodiment and mode concerns adapting timing for applying SCell setup or release commands. According to this aspect of the technology described herein, the wireless terminal (UE) 320, prior to applying a received SCell setup or release command, may first check whether it is being scheduled or expected to be scheduled on one or more serving cells. If the wireless terminal (UE) determines that it is being scheduled or expected to be scheduled within a certain time instance then the wireless terminal (UE) may apply the received command with certain delay. The wireless terminal (UE) may determine about scheduling by using any of several mechanisms, as discussed above. The wireless terminal (UE) may apply the SCell setup or release command with a particular delay based on one or more pre-defined rules and/or based on explicit indication from the network.

One or more exemplary pre-determined rules may be specified allowing the wireless terminal (UE) to apply the SCell setup or release command with certain delay. Example rules are listed below:

Rule 1: It may be pre-determined, e.g., by an applicable standard, that the wireless terminal (UE) is allowed to apply the received SCell setup or release command with a particular delay provided the wireless terminal (UE) is being scheduled while receiving the command, e.g., it may apply the command in N subframes or instances after the reception of the said command.

Rule 2: It may also be pre-determined in the standard that the wireless terminal (UE) is allowed to apply the received SCell setup or release command when the wireless terminal (UE) is not scheduled or certain subframes after being scheduled.

Rule 3: Rule 1 and Rule 2 may be applicable only in certain conditions, e.g., when SINR or SNR is below a threshold, BLER is above a threshold, etc.

Rule 4: Rules 1-3 may be applicable only for certain type of SCell command, e.g., only for SCell activation, SCell deactivation, etc.

Rule 5: Rules 1-4 may be applicable only for a particular type or types of carrier aggregation configuration, e.g., DC-HSDPA, DC-HSUPA, intra-band contiguous CA, etc.

Rule 6: Rules 1-5 may be applicable only when the wireless terminal (UE) supports certain type of RF architecture for carrier aggregation configuration, e.g., single RF radio chain for receiving and/or transmitting plurality of serving cells, etc.

According to another aspect of the second example embodiment and mode the network may explicitly indicate to the wireless terminal (UE) whether or not the wireless terminal (UE) is allowed to apply the SCell release or setup command with a particular delay if the wireless terminal (UE) is being scheduled on serving cell(s). The network may also indicate the amount of delay with which the wireless terminal (UE) may apply the command. The maximum allowed delay may also be pre-determined. Alternatively, the wireless terminal (UE) may delay until a time that is the minimum of the maximum allowed delay and the time when no data is scheduled to the wireless terminal (UE). For example, the wireless terminal (UE) may apply the SCell activation command to activate the SCell after 10 milliseconds in case it is being scheduled.

According to another aspect of the second example embodiment and mode, the wireless terminal (UE) may determine whether it is being scheduled by reading a suitable downlink control channel containing scheduling information. The wireless terminal (UE) may also determine the expected scheduling instance by using pre-determined scheduling information, type of service, etc. Example aspects and implementations are described below.

Figure 9:
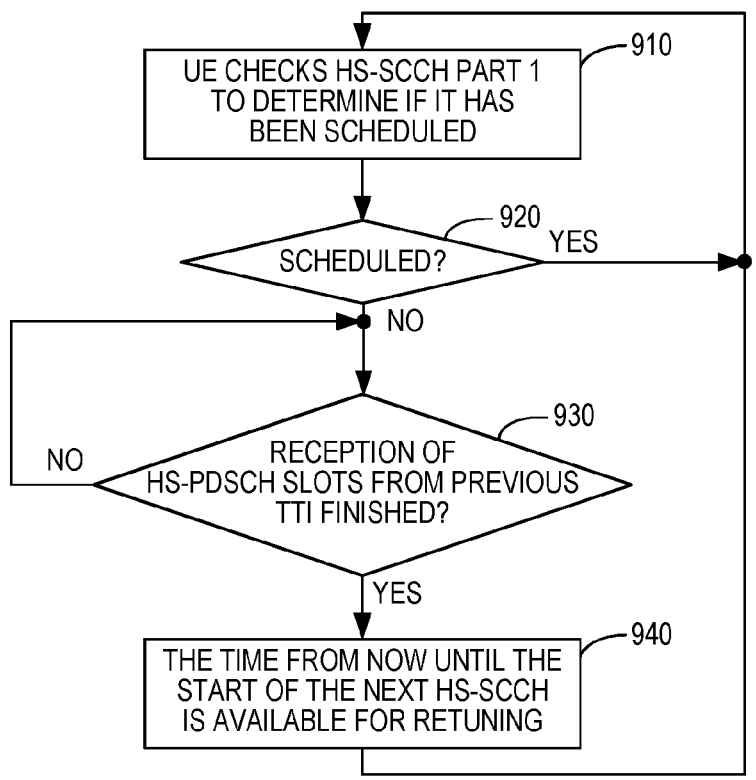
FIG. 9 is a flowchart showing operations or steps pertaining to implementation of the presently disclosed techniques to HSPA.

In HSPA the activation or deactivation command (sometimes referred to as an activation or deactivation order) and the scheduling information are sent via HS-SCCH. If the wireless terminal (UE) has a deactivated secondary carrier, the wireless terminal (UE) monitors the HS-SCCH on the primary carrier in order to decide when would be a convenient time to retune its RF bandwidth. A convenient time for RF tuning (activation/deactivation) would be during times at which the wireless terminal (UE) has not been scheduled. The wireless terminal (UE) may determine the likelihood that it has been scheduled by examining the first slot of the HS-SCCH, as shown at block 910 of FIG. 9. If it determines after this first slot that it has not been scheduled (block 920), and if any reception of HS-PDSCH slots from a previous scheduling (on a previous TTI) is finished (block 930), then the wireless terminal (UE) may switch on the secondary chain in the following two slots without interrupting any data reception, as shown at block 940.

There are several means by which the wireless terminal (UE) may determine whether it has been scheduled after the first slot, including:

If the modulation format is 64 QAM and yet the UE is not 64 QAM capable or is not configured for 64 QAM, then the UE knows it has not been scheduled.

If the number of streams is two and yet the wireless terminal (UE) is not MIMO capable or has not been configured with MIMO, then the UE knows it has not been scheduled.

If the modulation order is 64 QAM and yet the wireless terminal (UE) has reported a CQI with low SINR that is not consistent with 64 QAM reception, then the UE knows that it has not been scheduled.

If the wireless terminal (UE) has been scheduled in the last TTI and now does not detect a scheduling allocation on the same HS-SCCH used in for the last TTI, then the UE knows that it has not been scheduled. According to 3GPP TS 25.214, v. 11.4.0 (2012-12), 3rd Generation Partnership Project; Technical Specification Group Radio Access Network; Physical layer procedures (FDD); (Release 11), incorporated herein by reference, if a wireless terminal (UE) is scheduled in one TTI then it may only be scheduled using the same HS-SCCH in the next consecutive TTI.

In LTE, the wireless terminal (UE) is scheduled via PDCCH on the primary serving cell. If the UE has a deactivated secondary carrier, it monitors the PDCCH on the primary carrier in order to decide when would be a convenient time to retune its RF bandwidth. A convenient time for RF tuning (activation/deactivation) would also be during times at which the UE has not been scheduled. The wireless terminal (UE) has to read only the control symbols in each subframe (symbol #0 to 2), the number of which depends on the system configuration (e.g., channel bandwidth). If the UE is not scheduled in that subframe, then the wireless terminal (UE) may retune its RF bandwidth for one or more purposes, e.g., for measuring on deactivated secondary serving cells, etc.

The wireless terminal (UE) may also determine the expected scheduling instances on serving cells by using one or more of the conditions or criteria discussed above, e.g., based on data in uplink or downlink buffers; scheduling of data; type of service; wireless terminal (UE) reporting instances; and wireless terminal (UE) scheduling request or urgency. Information related to these criteria is partially or fully available at the wireless terminal (UE), e.g., CSI reporting instances, wireless terminal (UE) data buffer size, etc.

Figure 10:
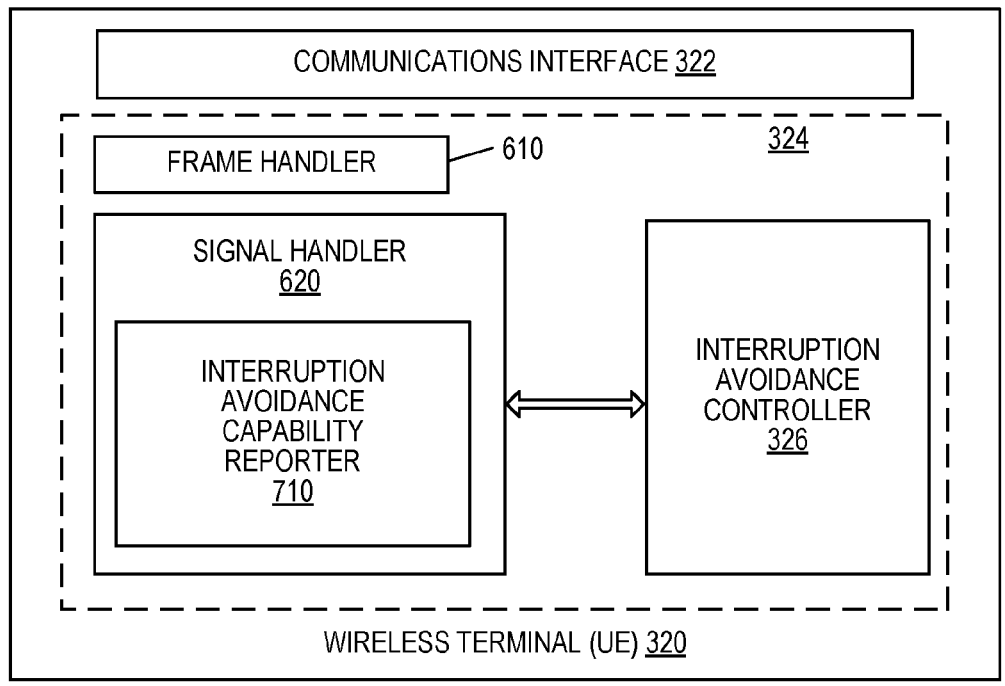
FIG. 10 is a schematic view of an example wireless terminal according to a third example embodiment and mode.

FIG. 10 is another illustration of a wireless terminal 320, according to a third example embodiment and mode. This third example embodiment and mode concerns a multi-carrier capable wireless terminal 320 and a corresponding method in a multi-carrier capable wireless terminal 320 served by a radio network node.

The wireless terminal 320 of FIG. 10 comprises a communication interface 322; a frame handler or scheduler 610; a signal handler 620; and the wireless terminal interruption avoidance controller 326. Other units and functionalities such as those illustrated in FIG. 6 may also be included. The frame handler/scheduler 610 processes the frame, block, or other unit of information communicated across the radio interface with the radio network node. Such processing may include de-formatting portions of the frame to obtain information transmitted on the downlink and formatting portions of the frame for transmission on the uplink. The signal handler 620, which may coincide with or be separate from the frame handler 610, depending on type of signal received, interprets and processes signals received from the radio network node and prepares signals destined to the radio network node. The signal handler 620 of FIG. 10 comprises an interruption avoidance capability reporter 710, which generates an indication that the wireless terminal is capable of avoiding interruption of a serving cell according to one or more example embodiments of the technology disclosed herein. This indication may then be transmitted to the radio network node, via the communications interface 322.

Figure 11:
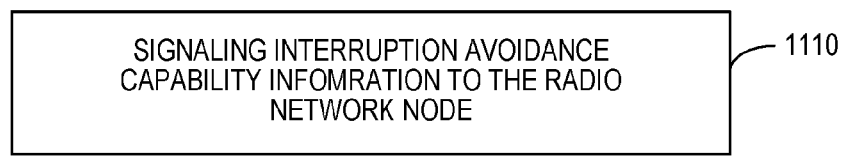
FIG. 11 is a flowchart showing example, representative, non-limiting operations or steps performed by a wireless terminal of the third example embodiment.

FIG. 11 illustrates an example, representative, non-limiting operation or step performed by the wireless terminal 320 of the third example embodiment. As shown at block 1110, the wireless terminal 320, using the interruption avoidance capability reporter 710, for example, signals capability information to the radio network node. The capability information indicates that the wireless terminal 320 is capable of adapting a timing at which to extend or shorten receiver RF bandwidth for performing one or more radio measurements on at least one second deactivated SCell such that the timing does not coincide with a scheduling instance during which the wireless terminal is expected to be scheduled on the PCell and/or on at least one activated first SCell. In an example implementation, the operation of signaling the capability information may be in response to reception of a wireless terminal capability inquiry message from the radio network node.

Some CA-capable wireless terminals may not be capable of adapting the timing at which the wireless terminal (UE) retunes its receiver and/or transmitter RF bandwidth to account for serving cell operation. Therefore, according to this third example embodiment the CA-capable wireless terminal (UE) indicates or provides relevant capability information to the network node (e.g., eNode B, RNC, Node B, relay, BS, positioning node (E-SMLC), etc.) associated with the timing adjustment of the RF bandwidth tuning.

The wireless terminal (UE) capability information may indicate the network that the wireless terminal (UE) is capable of adapting or adjusting the time instance of RF bandwidth tuning for performing one or more radio tasks on deactivated secondary serving cell(s) in order to avoid or minimize loss of signals on one or more serving cells. Examples of radio tasks herein are performing measurements on deactivated secondary serving cell(s), applying received SCell setup or release command to activate/deactivate/configure/deconfigure one or more SCells, etc.

The UE capability information sent to the network node may also contain additional or specific information, such as information indicating that:

The wireless terminal (UE) is capable of the above capability only for certain types of tasks, e.g., for performing measurements, for performing certain types of measurements such as positioning measurements, mobility measurements, etc.

The wireless terminal (UE) is capable of the above capability only for certain types of carrier aggregation configuration, e.g., for DC-HSDPA, 4C-HSDPA, etc.

The wireless terminal (UE) is capable of the above capability only for up to a particular carrier aggregation configuration, e.g., for a maximum of 40-MHz total bandwidth, for up to four serving cells (PCell and three SCells), etc.

The UE may send the capability information to the network node in any of the following manners:

Proactive reporting without receiving any explicit request from the network node (e.g., serving or any target network node); or Reporting upon receiving any explicit request from the network node (e.g., serving or any target network node).

An explicit request may be sent to the UE by the network any time, or at any specific occasion. For example, the request for the capability reporting may be sent to the UE during initial setup or after a cell change (e.g., handover, RRC connection re-establishment, RRC connection release with redirection, PCell change in CA, PCC change in PCC, etc.).

In case of proactive reporting the UE may report its capability during one or more of the following occasions:

During initial setup or call setup, e.g., when establishing the RRC connection.

During cell change, e.g., handover, primary carrier change in multi-carrier operation, PCell change in multi-carrier operation, RRC re-establishment, RRC connection release with redirection, etc.

The acquired wireless terminal (UE) capability information may be used by the network node for performing one or more radio operation tasks or actions. The radio operational tasks comprise of selection of a procedure, adapting a parameter in a configuration message related to measurement reporting, scheduling, etc. Examples of such tasks are:

One example of radio operation task is the decision at the network node whether it should delay the SCell setup or release command itself, or let the wireless terminal (UE) selectively delay the command when wireless terminal (UE) is being scheduled on serving cell, i.e., selection between methods of the first and second example embodiments discussed above.

In another example, if the wireless terminal (UE) is capable of adapting the time to apply the SCell command then the network may also signal the corresponding parameter values to the wireless terminal (UE), e.g., an indicator to permit the wireless terminal (UE) to apply the command with certain delay, amount of delay, etc.

In view of the detailed examples and description provided above, it will be appreciated that the presently disclosed techniques include embodiments other than those illustrated in the process flow diagrams included in the attached figures and described above. For example, another example embodiment includes a method, implemented in a wireless terminal adapted for multi-carrier operation, the method including performing at least one first measurement on cells on the configured SCC with a deactivated secondary serving cell (SCell), performing at least one second measurement on at least one cell other than the cells on the SCC with deactivated SCell, and adapting one or more measurement operations in order to meet the at least one pre-defined requirement requirements associated with the performed second measurement. The second measurement may be performed on a cell belonging to inter-frequency carrier or inter-RAT carrier frequency, for example. The measurement operations in these embodiments may include one or more of: an adaptation of instance of obtaining measurement samples, an adaptation of timing for retuning RF bandwidth of receiver for performing measurements, an adaptation of radio measurement sampling rate, and an adaptation of a length of radio measurement samples. Other embodiments include corresponding wireless terminals configured to carry out one or more of these methods.

In example embodiments described herein or otherwise encompassed hereby, various elements or units that are bounded or enclosed by broken lines, such as the controllers and/or processors described herein, may be realized by a machine platform. The terminology "machine platform" is a way of describing how the functional units may be implemented or realized by machine. The machine platform can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section (which in turn can comprise random access memory; read-only memory; an application memory (a non-transitory computer readable medium which stores, e.g., coded non instructions which can be executed by the processor to perform operations described herein); and any other memory such as cache memory, for example). Another example platform suitable is that of a hardware circuit, e.g., an application specific integrated circuit (ASIC) wherein circuit elements are structured and operated to perform the various operations described herein.

Although terminologies from 3rd-Generation Partnership Project (3GPP) and 4G are used in this disclosure for explanation purposes, this should not be seen as limiting the scope of the disclosed subject matter to only the aforementioned system. Other wireless systems, such as Worldwide Interoperability for Microwave Access (WiMax), Ultra Mobile Broadband (UMB), Global System for Mobile Communication (GSM) and others may benefit from exploiting the ideas covered within this disclosure.

The embodiments encompassed hereby apply to any type of multi-carrier mobile communication systems, including E-UTRA FDD, E-UTRA TDD, UTRA FDD, UTRA TDD, etc., or any combination of RATs for multi-carrier operation.

In some embodiments encompassed hereby, the non-limiting term "radio network node" is commonly used and may refer to any type of network node serving UE and/or connected to other network node or network element. Examples of radio network nodes are a base station (BS), eNode B, a network controller, a radio network controller, a base station controller, a relay, a donor node controlling relay, a base transceiver station (BTS), an access point (AP), etc. As used herein, the term "node" and/or "network node" may encompass nodes using any technology including, e.g., High-Speed Packet Access (HSPA), Long Term Evolution (LTE), Code-Division Multiple Access (CDMA) 2000, GSM, etc., or a mixture of technologies such as with a multi-standard radio (MSR) node (e.g., LTE/HSPA, GSM/HS/LTE, CDMA2000/LTE, etc.). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, including non-transitory computer-readable media such as solid-state memory, magnetic disk, or optical disk containing an appropriate set of computer instructions that would cause a processor to carry out the techniques described herein.

In some embodiments encompassed hereby even a more general and non-limiting term "network node" is used and may correspond to any type of radio network node or any network node, which communicates with at least a radio network node. Examples of network node are any radio network node stated above, core network node (e.g., MSC, MIME, etc.), O&M, OSS, SON, positioning node (e.g., E-SMLC), MDT, etc.

In some embodiments, the non-limiting term "user equipment (UE)" is used and may be any type of wireless device that communicates with a radio network node. Examples of user equipment are target device, device to device UE, machine type UE or UE capable of machine to machine communication, PDA, iPAD, Tablet, mobile terminals, smart phone, laptop embedded equipped (LEE), laptop mounted equipment (LME), USB dongles, etc. As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

Non-limiting, example advantages of the technology disclosed herein include the following:

A wireless terminal is allowed to intelligently decide when to activate and deactivate its secondary receiver in order to avoid disruption to data reception in its serving cell. This will reduce data loss in the downlink.

The network is allowed to selectively decide when to send the SCell setup or release command to the wireless terminal (UE) in order to avoid disruption to data reception on one or more serving cells.

A wireless terminal is enabled to meet pre-determined measurement requirements while avoiding or at least minimizing the data loss in the serving cell.

Although the description above provides details of several specific embodiments, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention for it to be encompassed hereby.

ABBREVIATIONS

Following is a non-exhaustive list of abbreviations that may appear herein:
3GPP $3^{rd}$ Generation Partnership Project
4C 4 Carriers
CA Carrier Aggregation
CC Component Carrier
CCE Control Channel Elements
CFI Control Format Indicator
CM Compressed Mode
CPICH Common Pilot CHannel
CRC Cyclic Redundancy Check
C-RNTI Cell-Radio Network Temporary Identifier
CSI Channel state information
CSR Channel status report
CQI Channel Quality Indicator
DB-DC-HSDPA Dual band dual cell HSDPA
DC-HSDPA Dual cell high speed uplink packet access
DFT Discrete Fourier Transform DL Downlink
eNB Evolved Node B
ePDCCH enhanced Physical Downlink Control Channel
GSM Global System for Mobile Communications
HARQ Hybrid ARQ
HO Handover
HSPA High-Speed Packet Access
L1 Layer 1
LTE Long Term Evolution
MAC Medium Access Control
MDT Minimization of drive tests
MIMO Mulltiple-Input, Multiple-Output
OFDM Orthogonal Frequency-Division Multiplexing
O&M Operational and Maintenance
OSS Operational Support Systems
PCC Primary component carrier
PCell Primary cell
PDCCH Physical Downlink Control Channel
PDSCH Physical Downlink Shared Channel
PRB Physical Resource Block
PUCCH Physical Uplink Control Channel
RACH Random Access Control Channel
RAN Radio Access Network
RAT Radio Access Technology
RF Radio Frequency
RNTI Radio Network Temporary Identifier(s)
RRC Radio Resource Control
RRM Radio Resource Management
RNC Radio Network Controller
RSCP Received Signal Code Power
SCC Secondary component carrier
SCell Secondary cell
SC-FDMA Single Carrier-Frequency Division Multiple Access
SON Self Organizing Network
UE User Equipment
UL Uplink

What is claimed is:

1. A method in a radio network node adapted to serve a multi-carrier capable wireless terminal, characterized in that the method comprises:
determining a scheduling instance during which the wireless terminal is expected to be scheduled, but not currently scheduled, on at least one cell;
determining a timing at which to send a setup command or a release command for a secondary cell, based on the scheduling instance, such that a corresponding setup procedure or release procedure does not coincide with the scheduling instance; and
sending the setup command or release command at the determined timing.

2. The method of claim 1, wherein determining the timing is further based on one or more of:
knowledge at the radio network node of instances at which the wireless terminal performs measurements;
a type of service provided to the wireless terminal;
measurement reporting instances at the wireless terminal;
scheduling of data to the wireless terminal by the radio network node;
a scheduling request corresponding to the wireless terminal.

3. The method of claim 1, wherein the timing for sending the setup command or release command is delayed, based on whether an amount of buffered data for the wireless terminal exceeds a threshold amount.

4. The method of claim 1, wherein the timing for sending the setup command or release command is determined with respect to a reference time instance.

5. The method of claim 1, further comprising receiving a capability of the wireless terminal from the wireless terminal, which capability indicates that the wireless terminal is capable of adapting the time instances for performing one or more radio measurements on a deactivated secondary cell and/or adapting the time instance for applying a setup command or release command for a secondary cell, such that the timing does not coincide with the scheduling instance during which the wireless terminal is expected to be scheduled on at least one cell by a radio network node.

6. The method of claim 1, wherein the setup command or release command is any of: configuration of the secondary cell, de-configuration of the secondary cell, activation of the secondary cell and deactivation of the secondary cell.

7. The method of claim 1, wherein the at least one cell on which the wireless terminal is expected to be scheduled is any cell other than the secondary cell for which the setup command or the release command is to be sent.

8. A method, in a multi-carrier-capable wireless terminal, characterized in that the method comprises:
determining a scheduling instance during which the wireless terminal is expected to be scheduled, but not currently scheduled, on at least one cell by a radio network node; and
determining a timing at which to change the radio-frequency, RF, bandwidth of a receiver, or to activate additional RF receiver circuitry, for performing one or more radio measurements on a deactivated secondary cell or for applying a setup command or release command for a secondary cell, such that the timing does not coincide with the scheduling instance; and
performing one or more radio measurements on the deactivated secondary cell or applying the setup command or release command at the determined timing.

9. The method of claim 8, wherein determining the timing is performed autonomously by the wireless terminal, based on one or more pre-determined rules.

10. The method of claim 8, wherein the pre-determined rules comprise one or more of:
the wireless terminal is allowed to apply the received setup command or release command with a particular delay;
the wireless terminal is allowed to apply the received setup command or release command during a time when it is not scheduled by the radio network node or a particular time after has been scheduled.

11. The method of claim 8, wherein determining the timing is based on a timing indication received from the radio network node.

12. The method of claim 8, wherein the method further comprises one or more of:
adapting the time instances at which the wireless terminal performs measurements, based on the respective determined timing; and
adapting the time instance at which the wireless terminal applies the setup command or release command based on the respective determined timing.

13. The method of claim 12, wherein the method further comprises adapting one or more measurement operations to meet one or more pre-defined requirements for the one or more radio measurements.

14. The method of claim 13, wherein adapting one or more measurement operations comprises one or more of:
adapting a radio measurement sampling rate;

adapting a length of radio measurement samples; and
adapting an instance of obtaining measurement samples.

15. The method of claim 13, wherein the one or more pre-defined requirements comprise one or more of:
cell identification delay;
CGI reporting delay;
measurement period;
measurement reporting delay;
measurement reporting time;
wireless terminal transmit timing accuracy;
measurement accuracy;
evaluation period of out-of-sync in RLM; and
evaluation period of in sync in RLM.

16. The method of claim 8, further comprising signaling a capability for the wireless terminal to the radio network node, which capability indicates that the wireless terminal is capable of adapting the time instances for performing one or more radio measurements on a deactivated secondary cell and/or adapting the time instance for applying a setup command or release command for a secondary cell, such that the timing does not coincide with the scheduling instance during which the wireless terminal is expected to be scheduled on at least one cell by a radio network node.

17. The method of claim 8, wherein the setup command or release command is any of: configuration of the secondary cell, de-configuration of the secondary cell, activation of the secondary cell and deactivation of the secondary cell.

18. The method of claim 8, wherein the at least one cell on which the wireless terminal is expected to be scheduled is any cell other than the secondary cell for which the setup command or the release command is to be applied.

19. A radio network node adapted to serve a multi-carrier capable wireless terminal, the radio network node comprising a communication interface circuit and a processing circuit, characterized in that the processing circuit is configured to:
determine a scheduling instance during which the wireless terminal is expected to be scheduled, but not currently scheduled, on at least one cell;
determine a timing at which to send a setup command or a release command for a secondary cell, based on the scheduling instance, such that a corresponding setup procedure or release procedure does not coincide with the scheduling instance; and
wherein the communication interface circuit is configured to send the setup command or release command at the determined timing.

20. The radio network node of claim 19, wherein the processing circuit is configured to determine the timing based further on one or more of:
knowledge at the radio network node of instances at which the wireless terminal performs measurements;
a type of service provided to the wireless terminal;
measurement reporting instances corresponding to the wireless terminal;
scheduling of data to the wireless terminal by the radio network node; and
a scheduling request corresponding to the wireless terminal.

21. The radio network node of claim 19, wherein the processing circuit is configured to delay the timing for sending the setup command or release command, based on whether an amount of buffered data for the wireless terminal exceeds a threshold amount.

22. The radio network node of claim 19, wherein the processing circuit is further configured to receive, via the communication interface circuit, a capability of the wireless terminal from the wireless terminal, which capability indicates that the wireless terminal is capable of adapting the time instances for performing one or more radio measurements on a deactivated secondary cell and/or adapting the time instance for applying a setup command or release command, such that the timing does not coincide with the scheduling instance during which the wireless terminal is expected to be scheduled on at least one cell by a radio network node.

23. A wireless terminal adapted for multi-carrier operation and comprising a communication interface circuit and a processing circuit, characterized in that the processing circuit is configured to:
determine a scheduling instance during which the wireless terminal is expected to be scheduled, but not currently scheduled, on at least one cell by a radio network node;
determine a timing at which to change the radio-frequency, RF, bandwidth of a receiver, or to activate additional RF receiver circuitry, for performing one or more radio measurements on a deactivated secondary cell or for applying a setup command or release command on a secondary cell, such that the timing does not coincide with the scheduling instance; and
wherein the communication interface circuit is configured to perform one or more radio measurements on the deactivated secondary cell or apply the setup command or release command at the determined timing.

24. The wireless terminal of claim 23, wherein the processing circuit is configured to determine the timing autonomously, based on one or more pre-determined rules.

25. The wireless terminal of claim 23, wherein the processing circuit is configured to determine the timing based on a timing indication received from the radio network node.

* * * * *